United States Patent [19]
Suzuki et al.

[11] 3,973,456
[45] Aug. 10, 1976

[54] COIL-LIKE ARTICLE SUPPLY DEVICE

[75] Inventors: Tsutomu Suzuki, Kawasaki; Takeo Matsumoto, Tokyo; Masahiro Sobukawa, Niiza, all of Japan

[73] Assignee: Tokyo Shibaura Electric Co., Ltd., Kawasaki, Japan

[22] Filed: July 22, 1975

[21] Appl. No.: 598,003

[30] Foreign Application Priority Data
July 25, 1974 Japan.............................. 49-85360
May 12, 1975 Japan....................... 50-61269[U]
May 12, 1975 Japan....................... 50-61270[U]
June 14, 1975 Japan............................ 50-72149

[52] U.S. Cl................................ 83/209; 83/277; 83/649; 83/925 R; 221/312 A
[51] Int. Cl.²......................................... B26D 5/20
[58] Field of Search............ 221/30, 312 A; 83/227, 83/925 R, 167, 417, 649, 279, 280

[56] References Cited
UNITED STATES PATENTS
2,624,880  1/1953  Lind et al. ....................... 221/312 A
3,668,759  6/1972  Kendall............................. 83/277 X

*Primary Examiner*—J. M. Meister
*Attorney, Agent, or Firm*—Oblon, Fisher, Spivak, McClelland & Maier

[57] ABSTRACT

A device for providing coil springs carried by a rope wound about a rotatable drum to a prescribed position, one by one, comprises a separation mechanism having a guide hole in which a prescribed number of coil springs are received, a pair of movable plates to pull the rope, a pair of moving plates holding the coil spring fallen from the guide hole and a pair of blades for cutting the rope after the rope is pulled.

8 Claims, 18 Drawing Figures

COIL-LIKE ARTICLE SUPPLY DEVICE

BACKGROUND OF THE INVENTION

This invention relates to a coil-like article supply device for automatically supplying coil-like articles such as coil springs.

Generally, where a large number of coil-like articles, for example, coil springs are received in a vessel, they are entangled with one another to present difficulties in individually separating them automatically. Accordingly, where the coil springs are supplied to, for example, an automatically assembling device, the individual separation of such coil springs has to be manually carried out. That is, a wholly automatic supply device for coil springs has not yet been exploited. At present, therefore, the coil springs are previously received, in a specifically arranged state, in, for example, a tray and, when assembling is performed, are manually or automatically taken out from the tray. The actual circumstance, therefore, is that the handling of the coil springs at the time of performing the assembling operation takes much labour to decrease the operation efficiency.

SUMMARY OF THE INVENTION

The object of the invention is to provide a coil-like article supply device which is capable of automatically delivering a large number of coil-like articles inserted over a rope and supplying them one by one to a prescribed corner or place, thereby to increase the operation efficiency.

DETAILED DESCRIPTION OF THE PREFERRED EMBODIMENTS

Hereinafter, the embodiment of the invention will be described with reference to the appended drawings. First, the whole construction of a coil-like article supply device is schematically described referring to FIGS. 1 and 2. A reference numeral 1 denotes a device body, which is comprised of a foundation 2 and a support frame 3 erected on the foundation 2. On the upper end of this support frame 3 is provided a delivery mechanism 7 whose rotary drum 6 is wound with a rope 5 such as a wire rope carrying a large number of coil-like articles, for example, coil springs 4 thereover so as to permit these coil springs 4 to be delivered jointly with the rope 5. On the forward side of the support frame 3 a pair of slide rods 8 are erected at a prescribed interval, the lower ends and upper ends of said slide rods 8 being fixed to the foundation 2 and to the horizontally extending portion of the support frame 3, respectively. To the slide rods 8 is fitted a slide board 9 reciprocatingly movable in the axial directions of the slide rods 8. On this slide board 9 is provided a separation mechanism 10, which separates and releases the coil springs 4 one by one with a prescribed timing delivered from the delivery mechanism together with the rope. Beneath the separation mechanism 10 is provided a vertically movable feed mechanism 11 for holding the rope 5 inserted thereinto through the separation mechanism 10 and then pulling the same downwardly. Between the feed mechanism 11 and the foundation 2 is provided a lifting board 12, on the upper surface of which is mounted a supply mechanism 13 for receiving the coil spring 4 released from the separation mechanism 10 and supplying the same with a prescribed timing. Beneath the supply mechanism 13 is provided a cutting mechanism 14 for cutting off the rope 5 pulled by the feed machanism 11. In the neighbourhood of the supply and cutting mechanisms 13, 14 is provided a conveyance mechanism 15 for conveying the coil spring 4 supplied from the supply mechanism 13 to, for example, an article arrangement section (not shown).

Next, the above-mentioned respective mechanisms are described in detail in the mentioned order. The delivery mechanism 7 includes a support legs 16 secured to the upper end portion of the support frame 3 and a rotation shaft 17 rotatably supported on the upper end of said support legs 16 through a journal bearing 18. One end portion of the rotation shaft 17 is fitted with the rotary drum 6 and the other end portion thereof is fitted with a pulley 19, and this pulley 19 is interlocked with a driving member such as a motor 21 through a belt 20 so that the drum 6 is rotated by the motor 21.

A cylinder CYL-4 is provided on the upper end portion of the support frame 3 through an attachment plate 22. At that position beneath the upper end portion of the support frame 3 which is opposite to this cylinder CYL-4 is provided a rockable arm 23 whose one end is pivotally supported on the support frame 3, and whose free end is connected to a piston rod 24 of the cylinder CYL-4. To the intermediate portion of the rockable arm 23 is attached a moving member 25 which is slidable longitudinally of the arm 23, and which is connected to the slide board 9 through a connection rod 26. Thus, the slide board 9 is arranged to be vertically reciprocatingly moved by the cylinder CYL-4. Two mechanical valves LS-7 and LS-8 are so disposed that when the slide board 9 is raised up to the highest position, this position is detected by the mechanical valve LS-7; and when the slide board 9 is lowered down to the lowest position, this position is detected by the mechanical valve LS-8.

Figure 2:
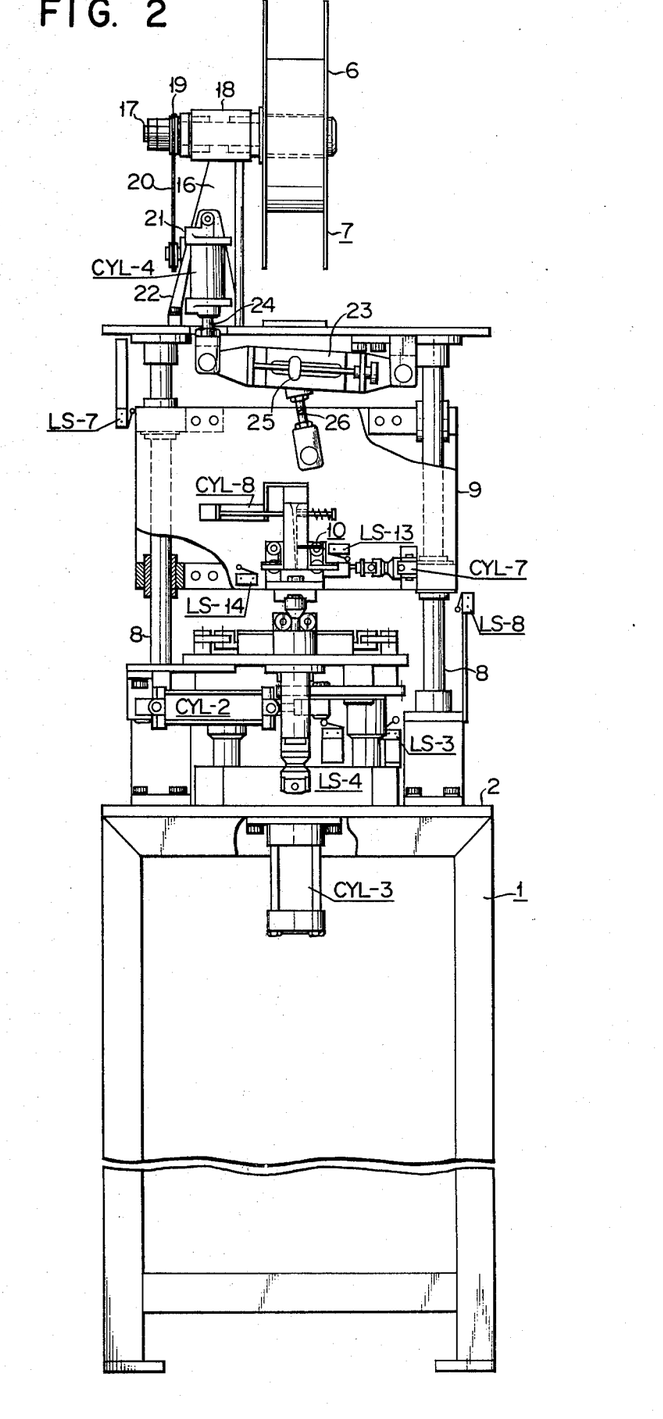
FIG. 2 is a front view, partly broken away, of the coil-like article supply device.
Figure 3:
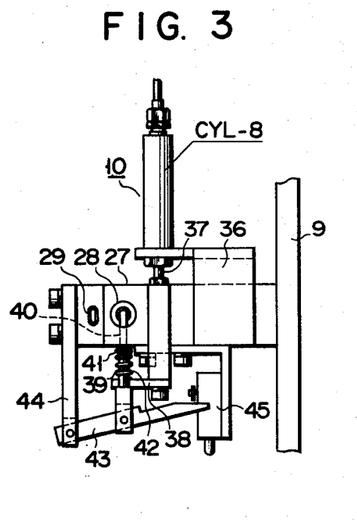
FIG. 3 is a plan view of a separation mechanism of the coil-like article supply device.
Figure 4:
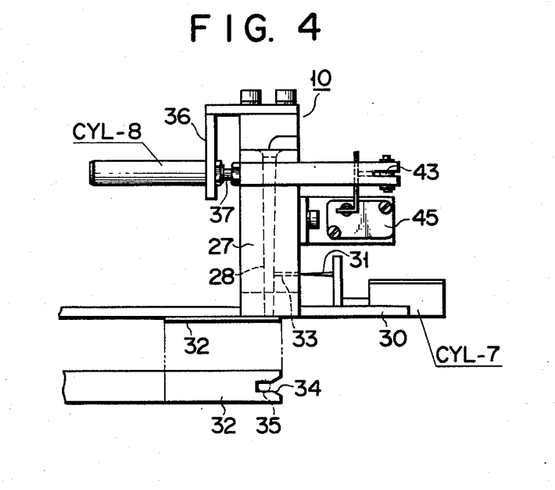
FIG. 4 is a front view of the separation mechanism.

The separation mechanism 10 includes a guide member 27 formed of transparent synthetic resin material attached to the lower end portion of the front face of the slide board 9 as illustrated in FIG. 3. The guide member 27 is bored with a guide hole 28 which vertically penetrates through the member 27. The coil springs 4 delivered from the delivery mechanism 7 are introduced into and through the guide hole 28 together with the rope 5. The guide member 27 is bored with an inclined air ejection hole 29, which is opened to the upper surface of the guide member 27 and connects to a substantially middle position of the guide hole so that the coil springs 4 supplied into the guide hole 28 may be pressed downwardly of the guide hole 28 by the wind from the hole 29. On the lower side of the guide member 27 is provided a laterally slidable member or slider 30, one end of which is connected to a cylinder CYL-7 fixedly mounted on the slide board 9. On an intermediate portion of the slider 30 a stop pin 31 is horizontally provided through a support piece, and on the underside of an intermediate portion of the slider 30 a stop piece 32 is attached. Both the stop pin 31 and the stop piece 32 are opposed to each other with the slider 30 interposed therebetween. The stop pin 31 may be inserted into a through hole 33 horizontally penetrating from the side face of the guide member 27 into the guide hole 28, so as to stop the second coil spring 4 located at the lowest second position. The stop piece 32, as illustrated in FIG. 4, is formed with a V-shaped notch 34 into which the coil spring 4 and the rope 5 are inserted, and a notch 35 interconnected with the notch 34 which may pass the rope 5, only. This stop piece 32 is situated on the lower side of the guide member 27 and is faced to the guide hole 28. When the slider 30 is advanced by operation of the cylinder CYL-7, the second one of the coil springs 4 received in the guide hole 28 is stopped by the stop pin 31 to permit only the lowest coil spring 4 to be released from the guide hole 28. Conversely, when the slider 30 is retired, the stop pin 31 escapes from the guide hole 28 to permit said second coil spring 4 to drop along the guide hole 28 thereby to permit it to be stopped by the stop piece 32. The advanced and retired positions may be detected by mechanical valves LS-13 and LS-14 as illustrated in FIG. 2, respectively. On one side of the guide member 27 is provided a cylinder CYL-8 through an attachment plate 36. The piston rod 37 of said cylinder CYL-8 penetrates laterally through the guide member 27 to extend up to opposite side thereof. To the tip end portion of this rod 37 is attached a connection plate 38, on which is slidably supported in parallel with the rod 37 a detection rod 39 for detecting the presence of the coil spring 4. The tip end portion of this detection rod 39 is slidably inserted into a through hole 40 penetrating laterally through the side portion of the guide member 27 up to the guide hole 28, and a washer 41 is fitted over the detection rod 39 at an intermediate portion thereof. Between the washer 41 and the connection plate 38 is interposed a coil spring 42 fitted over the detection rod 39, and the movement of the connection plate 38 is transmitted to the detection rod 39 through the coil spring 42. A rocking piece 43 is pivotally supported at its intermediate portion on the detection rod 39. The rocking piece 43 is pivotally supported at one end on an attachment plate 44 and is faced at the other end to a microswitch 45 so that only when a prescribed number of coil springs 4 do not exist in the guide hole 28, namely, no coil spring exists at the guide hole portion corresponding to the tip end of the detection rod 39, the rocking piece 43 closes the microswitch 45.

Figure 5:
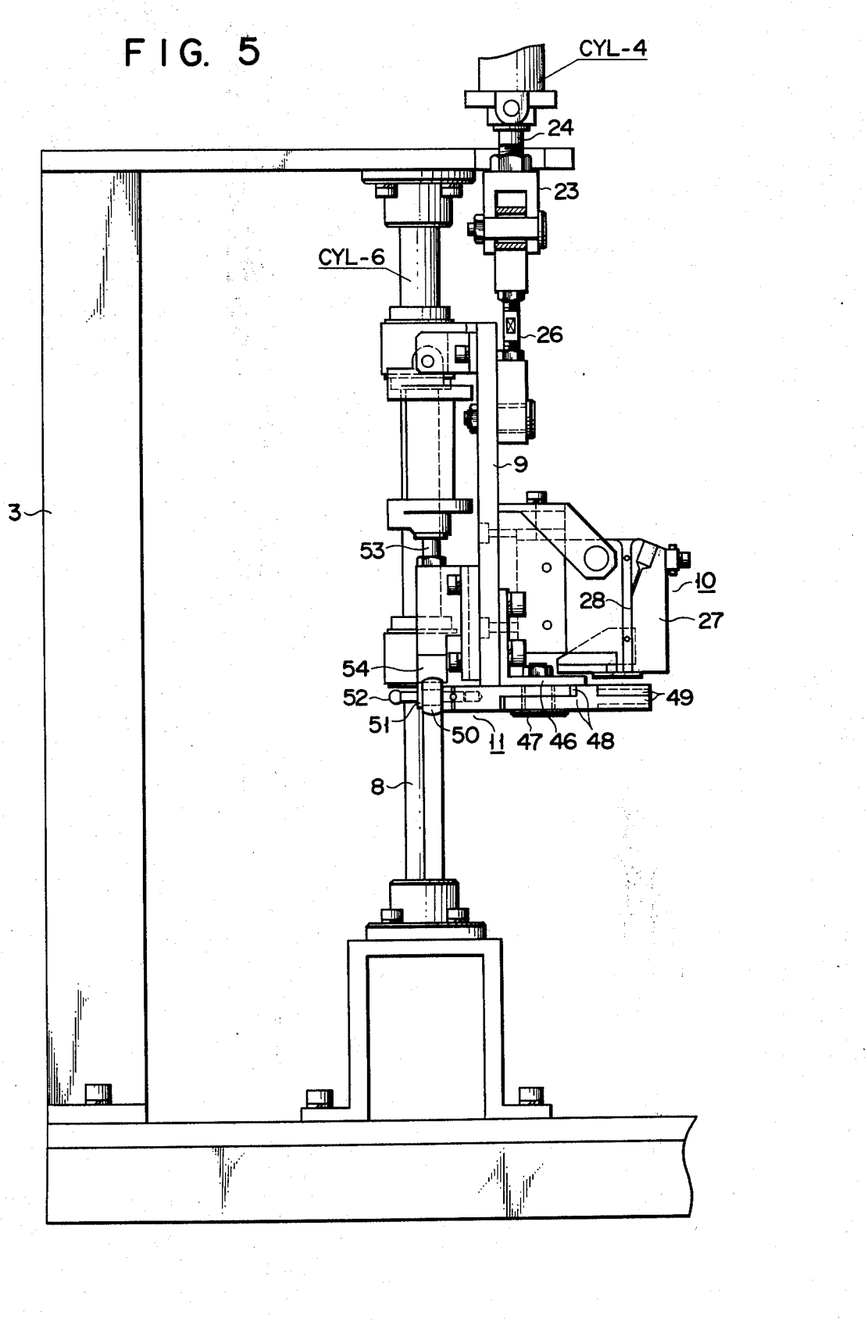
FIG. 5 is an enlarged side view of the part of said coil-like article supply device.
Figure 6:
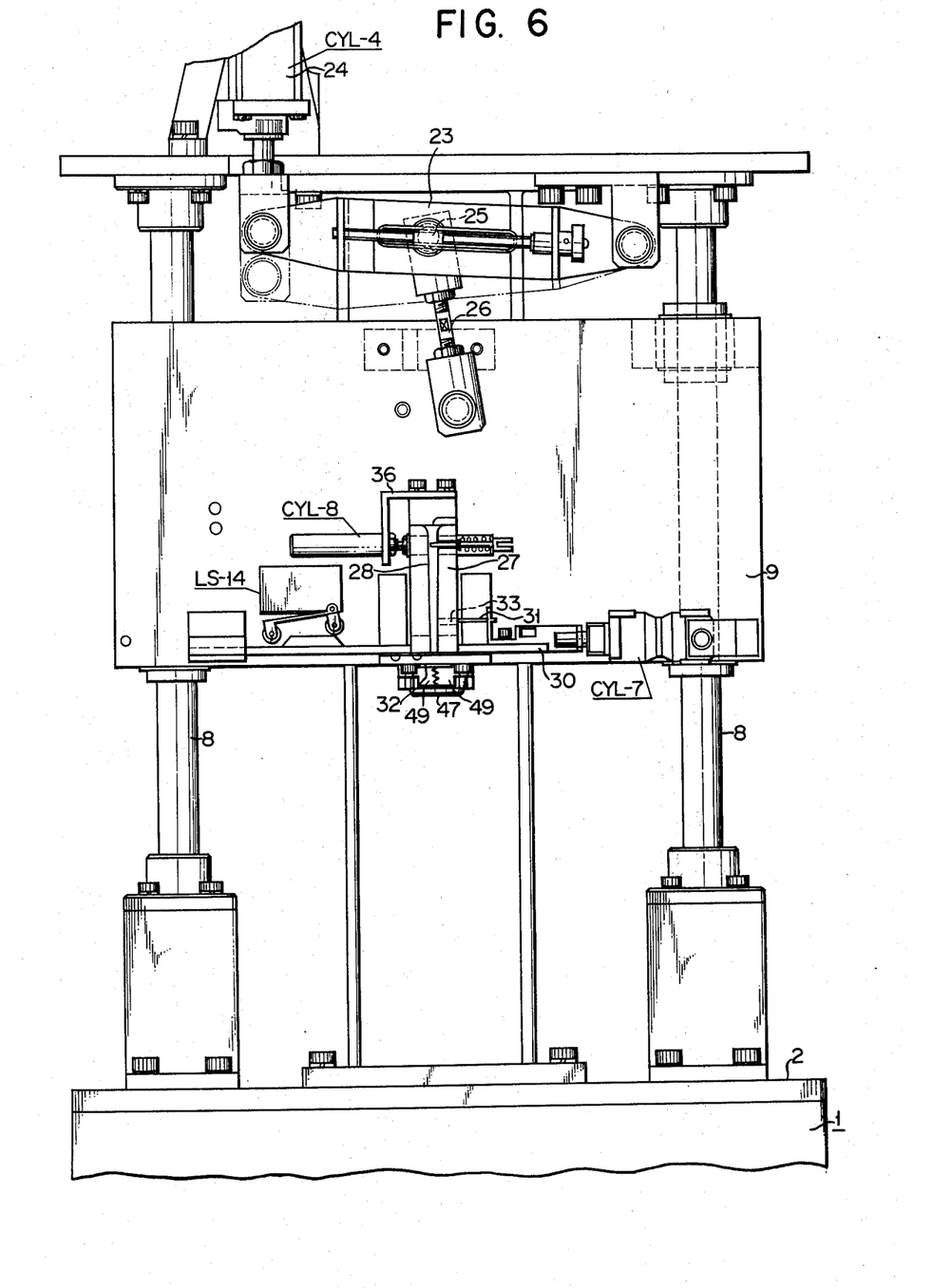
FIG. 6 is an enlarged front view of the part of said coil-like article supply device.

Next, to explain the feed mechanism 11 particularly with reference to FIGS. 5 and 6, a reference numeral 46 denotes an L-shaped attachment plate attached to the lower end portion of the slide board 9, and a pair of sandwiching pieces 48 are pivotally attached to the underside of the horizontal section of said attachment plate 46. The sandwiching pieces 48 have at their tip end portions, respectively, a pair of mutually opposite, saw tooth-like sandwiching sections 49, which are faced to the lower end opening of the guide hole 28 of the separation mechanism 10. A pair of mutually opposite rollers 50 are provided on the terminal end portions of the paired sandwiching pieces 48. On the terminal end faces of these sandwiching pieces 48 are provided, respectively, a pair of projections 51, between which is stretched a tension coil spring 52 tensioned in a direction permitting the sandwiching sections 49 to always press on each other. To the rear face of the slide board 9 is attached a cylinder CYL-6, to the tip end portion of a rod 53 of which is connected a wedge-shaped operating member 54 whose width is downwardly gradually narrowed. The operating member 54 is vertically moved as the cylinder CYL-6 operates so that when the operating member 54 is advanced or downwardly moved to enter between the rollers 50, the sandwiching sections 49 are spaced from each other against the restoring force of the coil spring 52; and when the operating member 54 is retired or upwardly moved to escape from between the rollers 50, the sandwiching sections 49 are pressed on each other by the tension force of the coil spring 52. On those portions of the slide board 9 in the neighbourhood of the operating member 54 are provided mechanical valves LS-11, LS-12 for detecting the advanced and retired positions of the operating member 54 (See FIG. 1).

Figure 1:
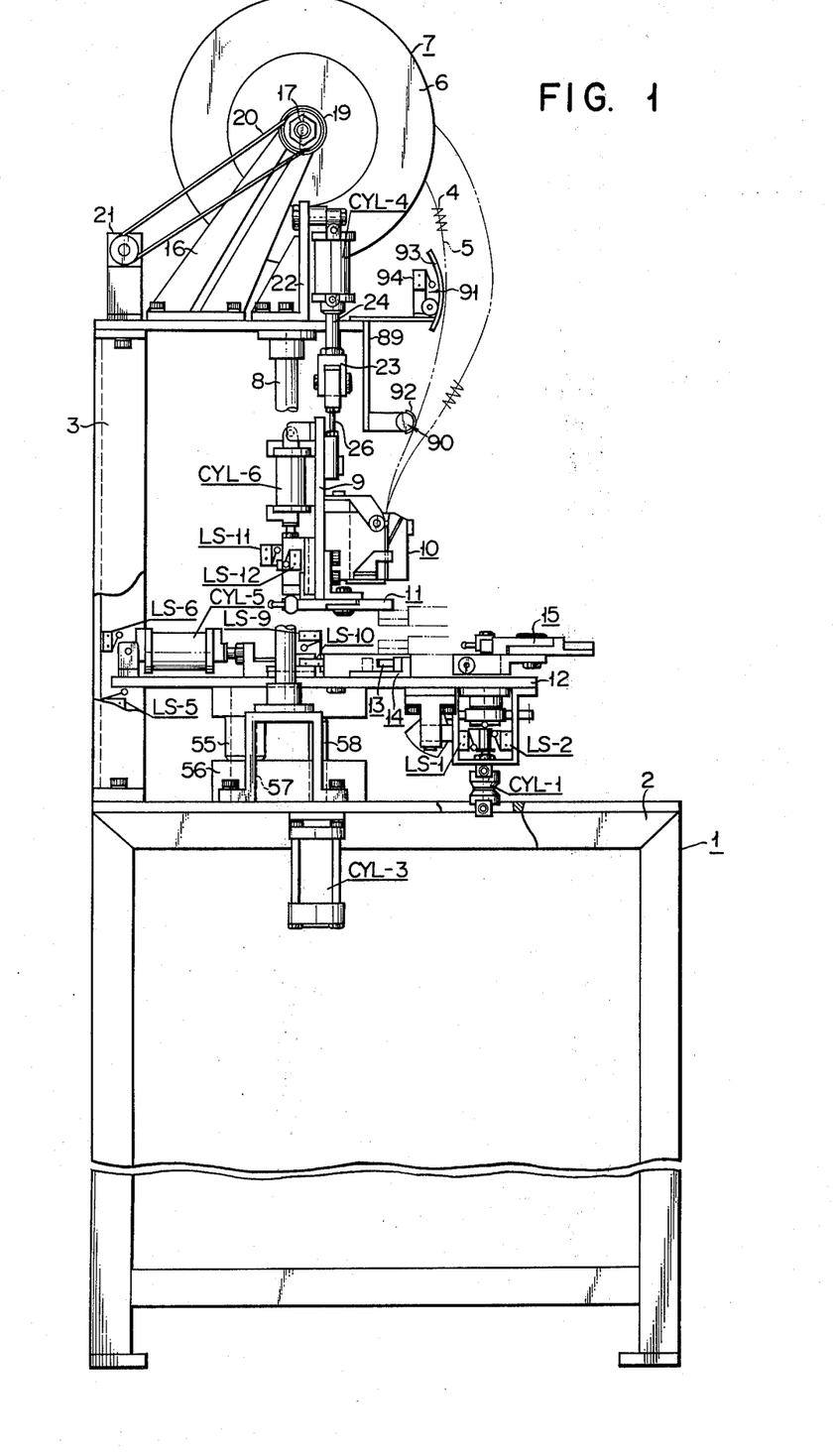
FIG. 1 is a side view, partly broken away, of a coil-like article supply device according to an embodiment of the invention.
Figure 7:
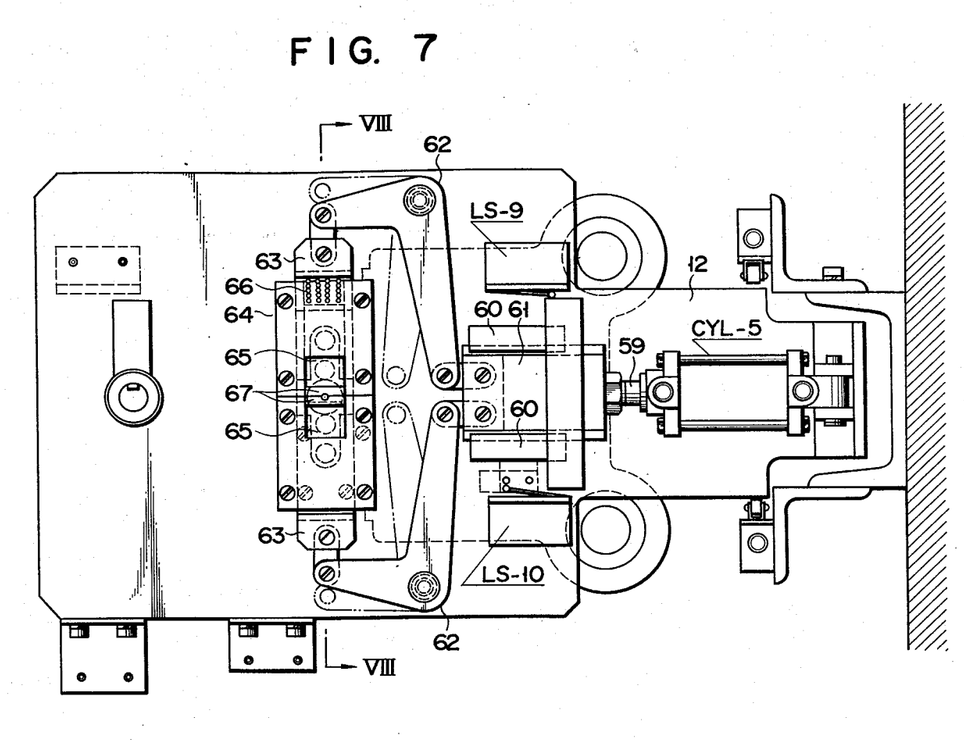
FIG. 7 is a plan view of supply mechanism and cut-off mechanisms of said coil-like article supply device.
Figure 8:
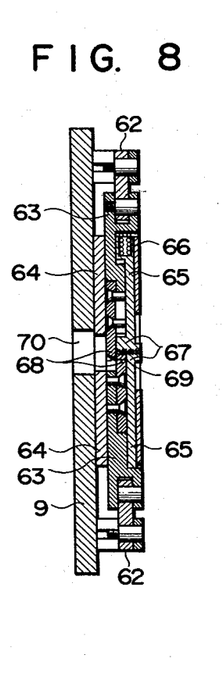
FIG. 8 is a sectional view taken along the line VIII—VIII of FIG. 7.

Next, the supply mechanism 13 and cutting mechanism 14 are explained. On the underside of the lifting board 12 supporting thereon the supply and cutting mechanisms 13, 14 is provided a downwardly projective sliding shaft 55, which is slidably inserted into a vertical through hole 57 of a holding block 56 provided on the foundation 2 as shown in FIG. 1. Beneath this holding block 56 is provided a cylinder CYL-3 whose piston rod 58 penetrates through the holding block 56 to be connected to the underside of the lifting board 12. As a result, this lifting board 12 is raised or lowered in accordance with the operation of the cylinder CYL-3, and its raised and lowered positions are detected by mechanical valves LS-6 and LS-5 mounted on the support frame 3, respectively. As illustrated in FIG. 7, a cylinder CYL-5 is mounted on the upper surface of the lifting board 12, and a piston rod 59 of this cylinder is provided with a moving piece 61 which is reciprocatingly moved into between a pair of guide pieces 60. The tip end portion of this moving piece 61 is connected to a pair of movable plates 63 through a pair of crank mechanisms 62. These movable plates 63 are received in a guide member 64 provided at a position faced to the sandwiching sections 49 of the feed mechanism 11, and are reciprocatingly moved in accordance with the rocking movement of the crank mechanisms 62 in a direction wherein the movable plates 63 draw close to or go away from each other. These movable plates 63 are provided respectively with sandwiching pieces 65, one of which is fixedly supported on one movable plate 63 and the other of which is slidably supported on the other movable plate 63 through a spring 66. The tip end faces of these sandwiching pieces 65 are formed respectively with saw tooth-like sandwiching sections 67, between which the rope 5 may be sandwiched. Beneath the paired sandwiching pieces 65 are provided a pair of cutting blades 68 fixed to the movable pieces 63, respectively (See FIG. 8), thereby to cut off the rope 5 pinched by the sandwiching sections 67. At a position faced to a cutting section 69 of the cutting blades 68 is provided a discharge hole 70 for discharging therethrough a cut-off rope portion having a prescribed length. The respective operations of the supply and cutting mechanisms 13, 14 as constructed above are checked by mechanical valves LS-9 and LS-10 for detecting the advanced and retired positions of the moving piece 61.

Figure 9:
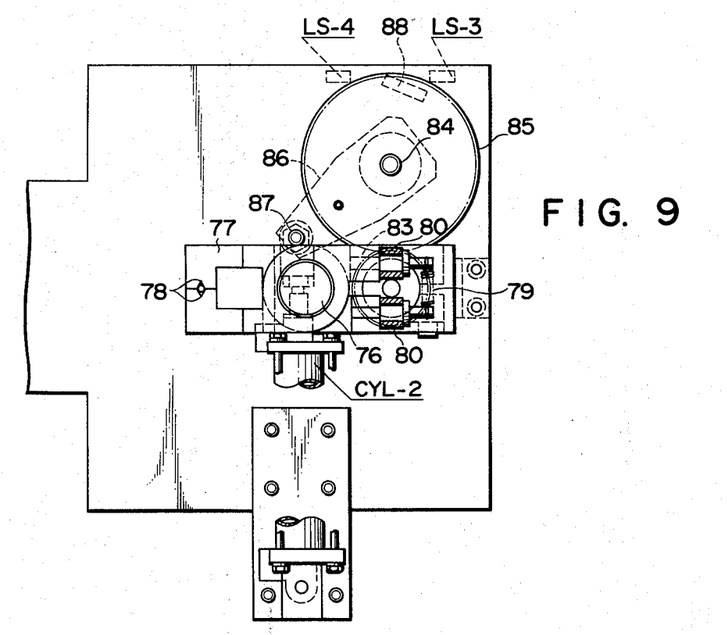
FIG. 9 is a plan view of a conveyance mechanism of said coil-like article supply device.
Figure 10:
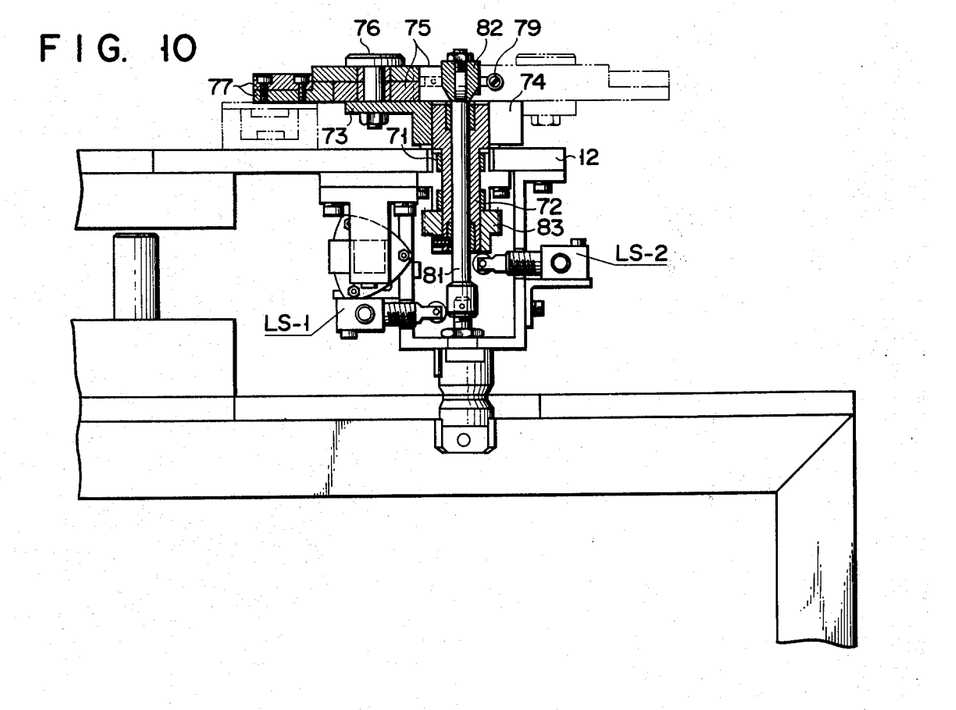
FIG. 10 is a front view, partly broken away, of the conveyance mechanism.

Next, to explain the conveyance mechanism 15, a rotary cylinder 72 is supported on the forward end portion of the lifting board 12 through a journal bearing 71, and its upper end portion is projected upwardly of the lifting board 12 while its lower end portion is projected downwardly of the lifting board 12 as shown in FIG. 10. On the upper end portion of this rotary cylinder 72 is fitted an attachment base 74 having a laterally projecting protrusion 73, on which a pair of rocking pieces 75 are rockably pivotally supported at their respective intermediate portions. To one side-ends of the rocking pieces 75 are attached respectively a pair of mutually opposite sandwiching pawls 77, the mutually opposite faces of which are formed respectively with notches 78 for sandwiching the coil spring 4. Between the other side-ends of the rocking pieces 75 is stretched a coil spring 79 always urging the sandwiching pawls 77 in a direction wherein they are pressed against each other, and a pair of rollers 80 are rotatably fitted over those portions of the rocking pieces 75 which are faced to the rotary cylinder 72. Through the rotary cylinder 72 is inserted an axially reciprocatingly movable slide shaft 81, the lower end portion of which is directly connected to a cylinder CYL-1 and to the upper end portion of which is secured a wedge-shaped operating member 82 insertable into between the rollers 80. The advanced position and retired position of the piston rod of the cylinder CYL-1 are detected by mechanical valves LS-1 and LS-2, respectively, provided in the neighbourhood of the slide shaft 81. On the lower end portion of the rotary cylinder 72 is fitted a small gear 83, which is meshed with a large gear 85 provided adjacent the small gear 83 as shown in FIG. 9. To a rotation shaft 84 of this large gear 85 is secured a rocking arm 86 at one end, said rocking arm 86 being connected at the other end to a piston rod of a cylinder CYL-2 through a pin 87. Thus, arrangement is so made that the reciprocating movement of the cylinder CYL-2 rod is transmitted to the large gear 85 through the rocking arm 86 and a 90°-rotating movement of this large gear 85 is transmitted to the small gear 83 thereby causing it to be rotated through an angle of 180°. At this time, the advanced and retired positions of the cylinder CYL-2 rod are detected by a contactor 88 and a pair of mechanical valves LS-3, LS-4.

As illustrated in FIG. 1, between the delivery mechanism 7 and separation mechanism 10 is provided an attachment member 89 which is fixed on the upper end of the support frame 3. A first detector 90 is attached to the lower end of this attachment member 89, while a second detector 91 is attached to the upper end of the member 89.

This first detector 90 is constituted by a touch limit switch 92 which, when the rope 5 contacts it, is turned on, so as to drive the motor 21 of the delivery mechanism 7 through a timer (not shown). The second detector 91 is composed of a rocking piece 93 faced to the travel path of the rope 5 and a microswitch 94 which is faced to the rear face of the rocking piece 93 and which, when the rocking piece 93 has been rocked through an angle wider than prescribed, is turned on. This microswitch 94 is connected to a relay valve connected to all cylinders CYL-1 to CYL-8, so as to enable the device to be stopped as required.

Figure 11:
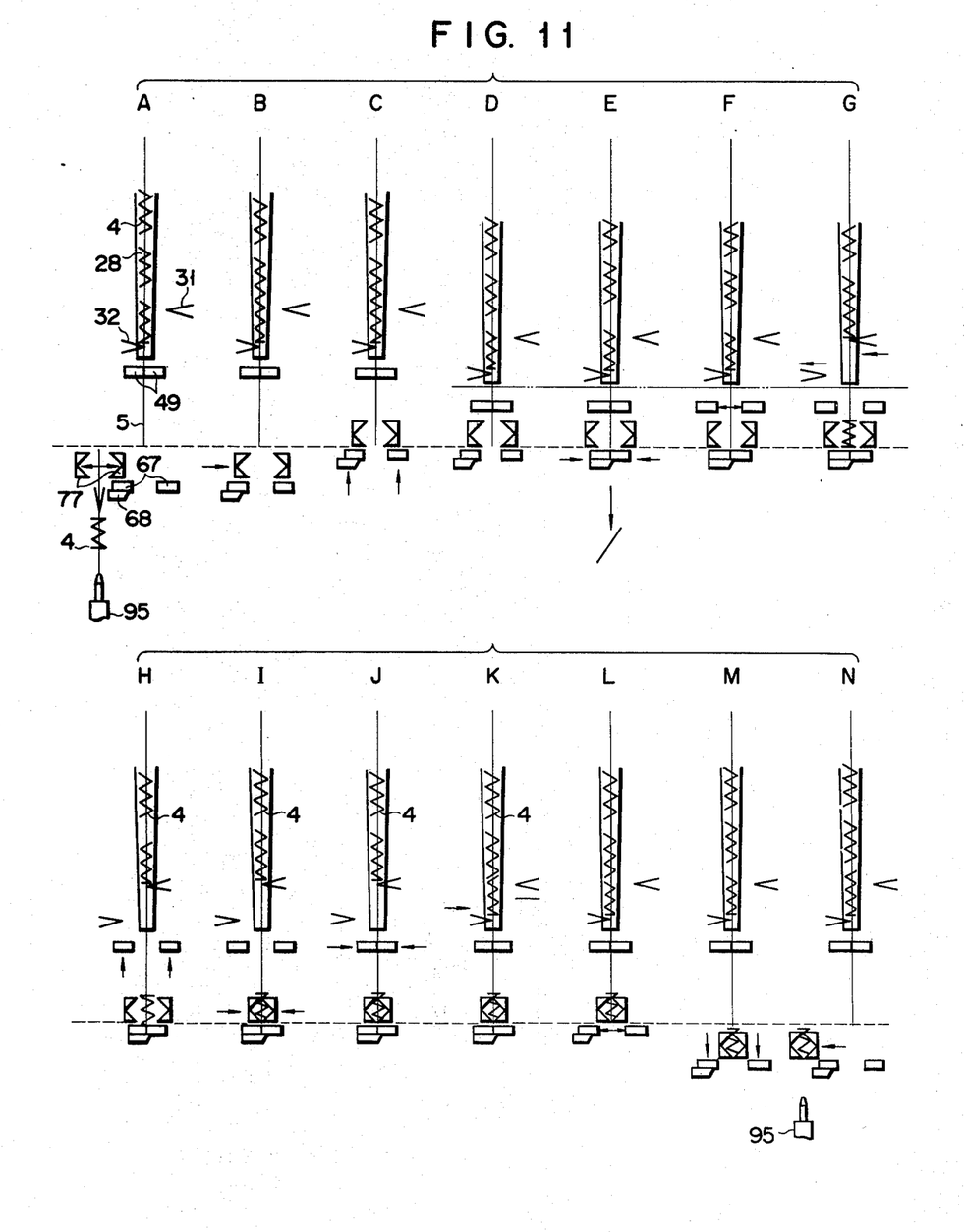
FIG. 11 is a schematic view for explaining the supply operation of said coil-like article supply device.
Figure 12:
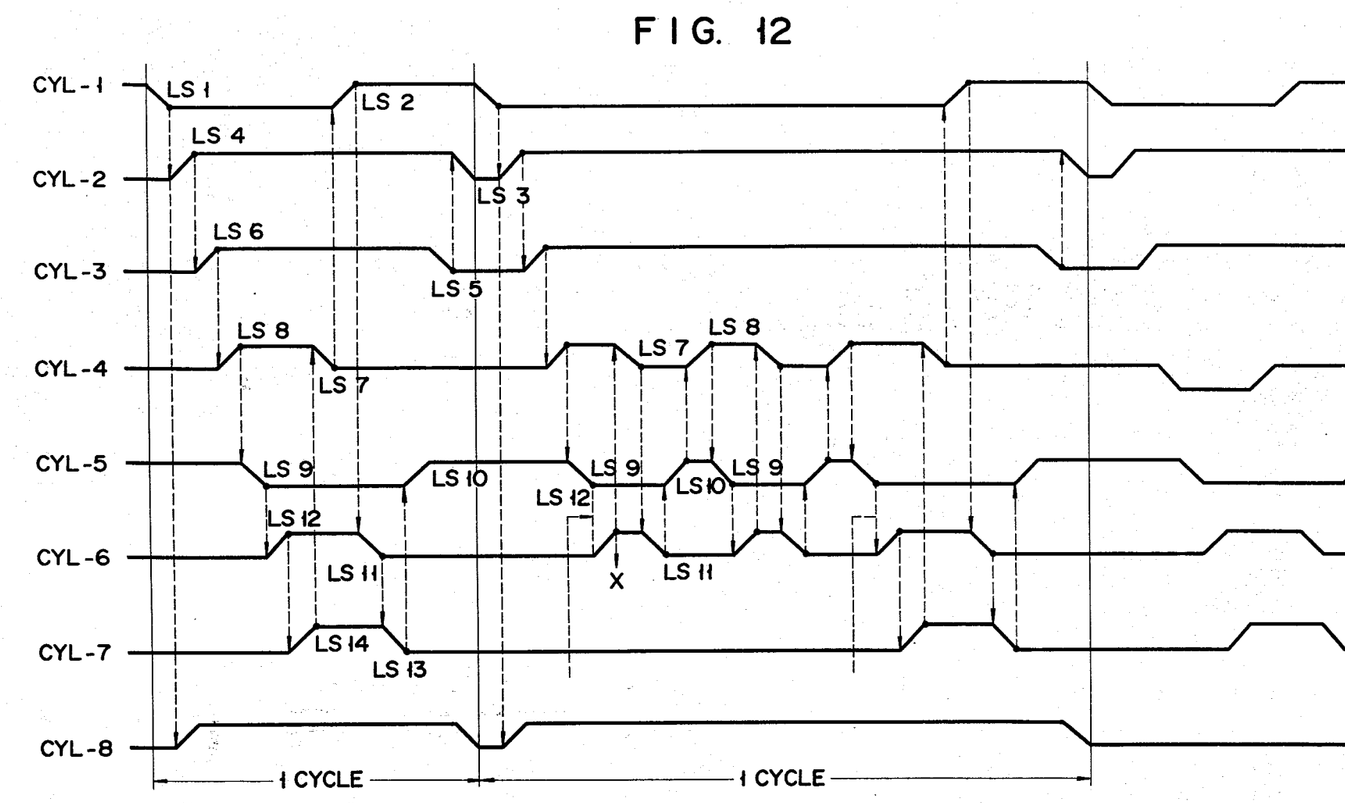
FIG. 12 is a time chart for the operation of said coil-like article supply device as a whole.
Figure 13A:
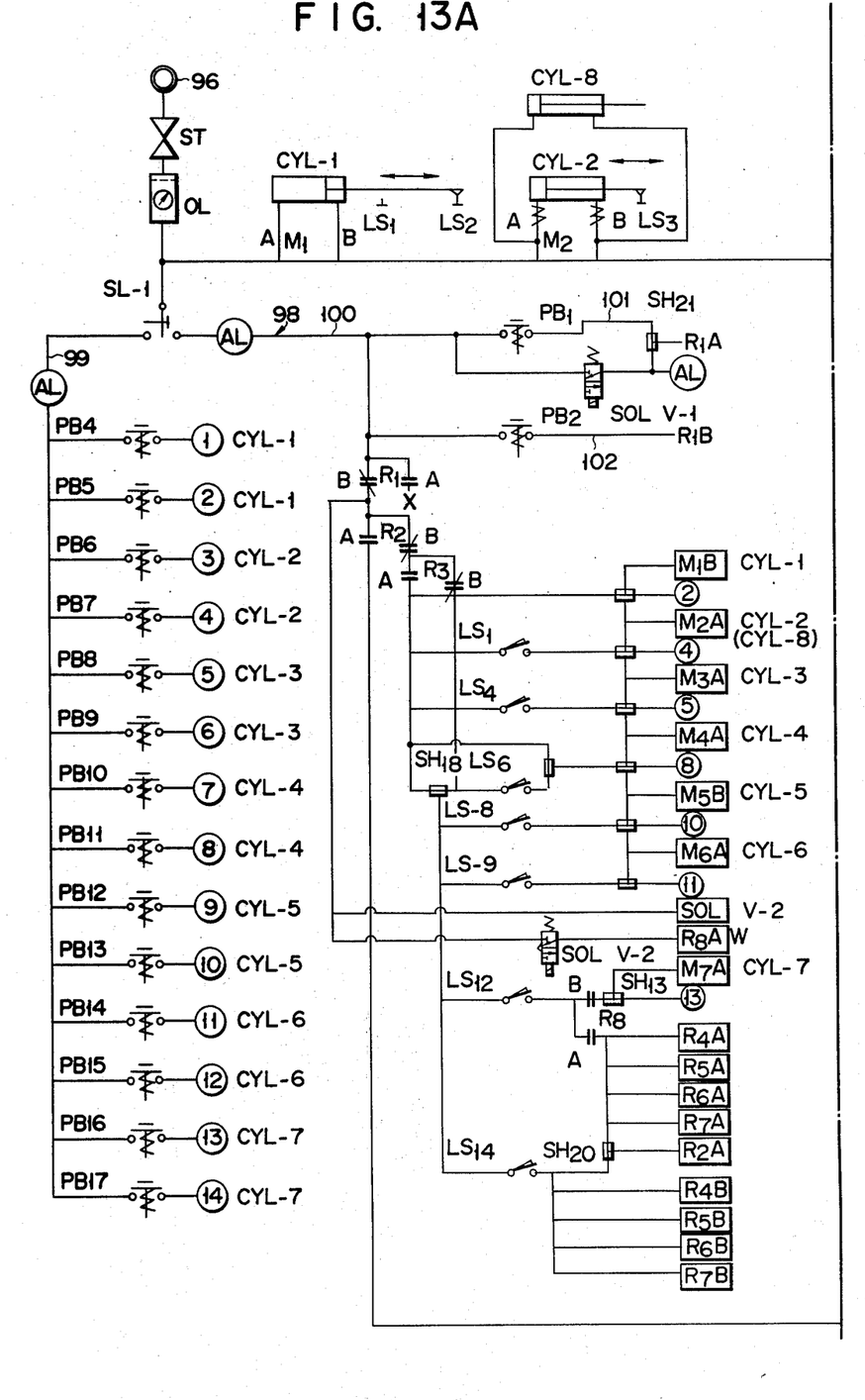
FIGS. 13A and 13B are systematic line views of said coil-like article supply device as a whole.
Figure 13B:
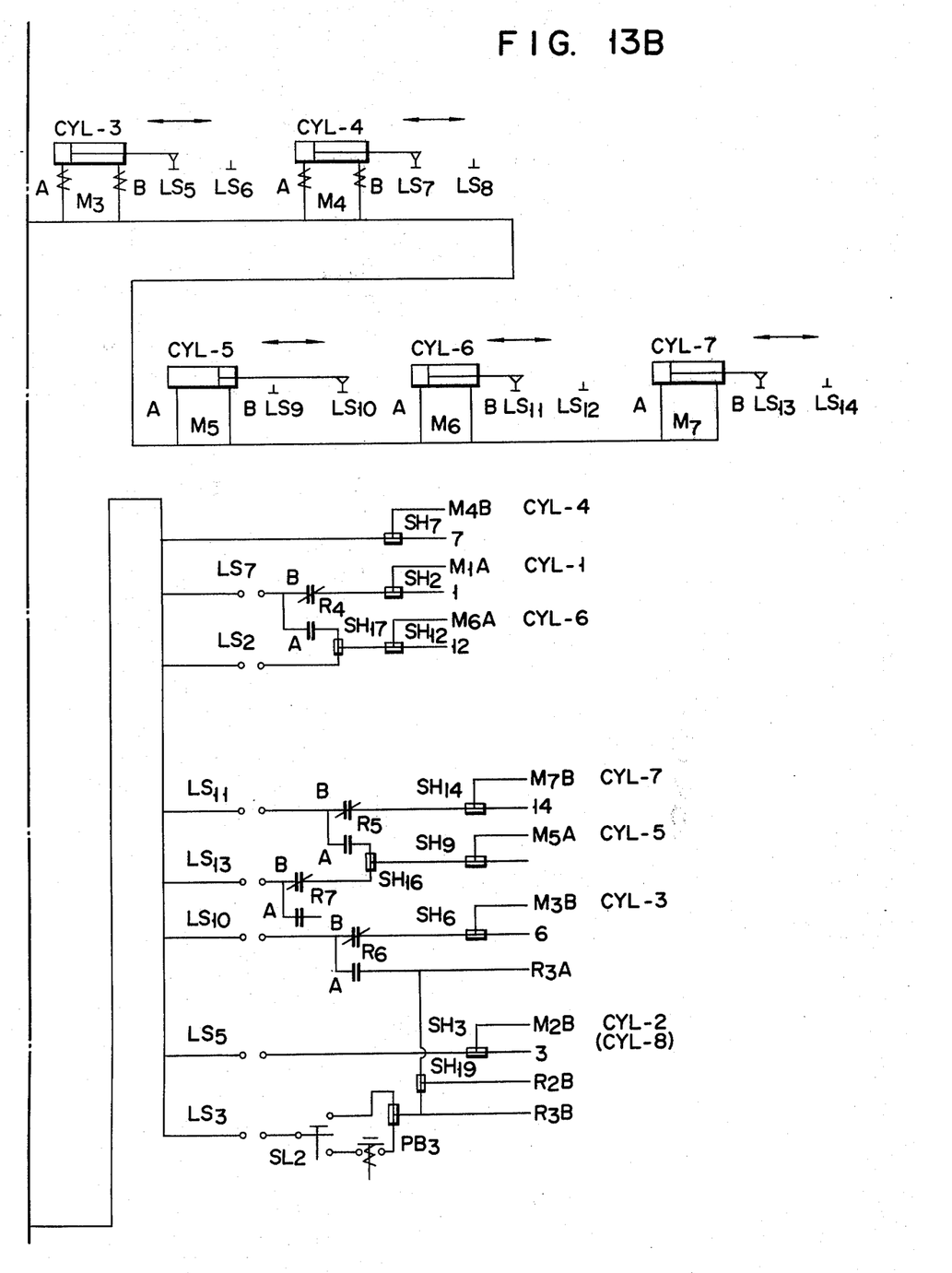
Figure 14:
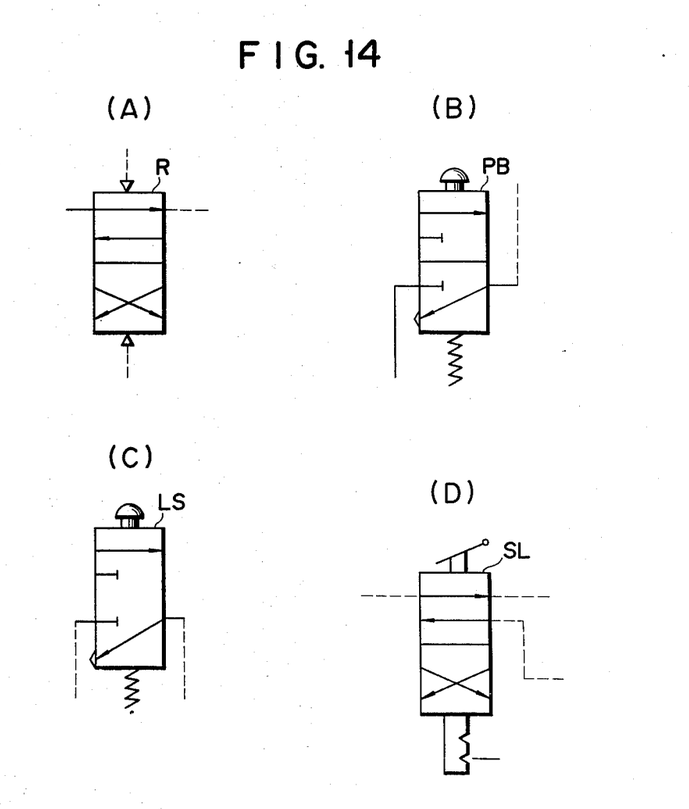
FIGS. 14A to 14D are enlarged views of valves employed in this invention.

Hereinafter, the operation of the above-constructed coil-like article supply device is explained with reference to the operation-explaining view of FIG. 11, the operational time chart of FIG. 12 and the systematic line view of FIGS. 13A and 13B. When, upon the start of the operation cycle, the cylinder CYL-1 rod is retired, the slide shaft 81 is lowered, so that the operating member 82 is entered into between the rollers 80. As a result, the rocking pieces 75 are rocked against the restoring force of the coil spring 79 to cause the sandwiching pawls 77 to be spaced from each other (see A in FIG. 11). When, in this way, the slide shaft 81 is lowered, the mechanical valve LS-1 is changed over to cause the cylinder CYL-2 rod to be advanced. Though, at this time, the cylinder CYL-8 rod is also advanced, this operation will be described later on. When the cylinder CYL-2 rod is advanced, the rocking arm 86 interlocked therewith is correspondingly rocked, and this rocking movement is transmitted to the large gear 85 and then to the small gear 83. The large gear 85 bears the gear ratio of 2 to the small gear 83, so that when the large gear 85 is rotated through an angle of 90°, the small gear 83 is rotated through an angle of 180°. Accordingly, the rotary cylinder 72 is rotated and the rocking pieces 75 are rocked with this rotary cylinder 72 as a rotation axis. For this reason, the sandwiching pawls 77 provided on the tip end portions of the rocking pieces 75 are opened and thus faced to the sandwiching sections 67 of the supply mechanism 13 (See B in FIG. 11). When, in this way, the sandwiching pawls 77 are brought to prescribed positions, the contactor 88 of the large gear 85 is caused to abut against the mechanical valve LS-4 to change over the same. Therefore, the cylinder CYL-3 rod is advanced. The rod 58 of the cylinder CYL-3 raises the lifting board 12 as indicated by C in FIG. 11, and when the lifting board 12 is raised up to a prescribed level, it abuts against the mechanical valve LS-6. When the mechanical valve LS-6 is changed over, the rod 24 of the cylinder CYL-4 is advanced. Accordingly, the rocking arm 23 is rocked downwardly through this rod 24 to cause the slide board 9 to be lowered through the connected rod 26. When the slide board 9 is lowered, the separation mechanism 10 and feed mechanism 11 attached thereto are also integrally lowered. When, in this way, the slide board 9 is lowered down to a prescribed position, the rope 5 theretofore sandwiched by the sandwiching sections 49 of the feed mechanism 11 is downwardly pulled, and the terminal end portion of the rope 5 is thereby passed through the supply mechanism 13 and the cutting mechanism 14 to be projected downward (see D in FIG. 11). When the slide board 9 is brought down to a prescribed position, the mechanical valve LS-8 is changed over and then the cylinder CYL-5 rod is retired. As a result, the moving piece 61 is slided into between the guide pieces 60 through the rod 59 to cause the movable pieces 63 to be moved through the crank mechanisms 62 in a direction approaching each other. When the sandwiching pieces 65 are advanced toward each other in accordance with this movement of the movable pieces 63, the sandwiching sections 67 are pressed against each other due to the restoring force of the springs 66 and the rope 5 is thus sandwiched therebetween. Further, the cutting blades 68 are also moved toward each other in accordance with said movement of the movable pieces 63 and therefore the rope 5 sandwiched between the sandwiching sections 67 is cut off (See E in FIG. 11). Upon completion of the rope cutting-off, the moving piece 61 moved in accordance with the retiring movement of the cylinder CYL-5 rod is allowed to abut on the mechanical valve LS-9 to change over the same, so that the rod 53 of the cylinder CYL-6 is advanced. When the rod 53 of cylinder CYL-6 is advanced, the operating member 54 is entered into between the rollers 50 through the rod 53 to cause the sandwiching pieces 48 to be spaced from each other against the restoring force of the coil spring 52. Accordingly, the sandwiching sections 49 provided at the tip end portions of the sandwiching pieces 48 are also spaced from each other, that is, go away from the rope 5 (See F in FIG. 11). When, in this way, the cylinder CYL-6 rod is advanced to reach a prescribed position, it abuts on the mechanical valve LS-12 to change over the same, so that the cylinder CYL-7 rod is advanced. Since, in accordance with this advancing movement of the cylinder CYL-7 rod, the slider 30 connected thereto is also advanced, the stop pin 31 is advanced toward the guide hole 28 and simultaneously the stop piece 32 is retired. Since, at this time, a plurality of coil springs 4 are received in the guide hole 28 along the rope 5, the second coil spring 4 located at the second lowest position is stopped when the stop pin 31 is extended via the through hole 33 into the guide hole 28. On the other hand, the coil spring 4 resting at the lowest position of the guide hole 28 is faced to the notch 34 of the stop piece 32 as this stop piece 32 is retired. Therefore, this coil spring 4 drops by being passed through the notch 34. Since, at this time, the coil spring 4 is in a state inserted over the rope 5, it drops on the sandwiching sections 67 of the supply mechanism 13 along the rope 5 and is placed thereon (See G in FIG. 11). When, in this way, the cylinder CYL-7 rod is advanced to a prescribed position, it abuts on the mechanical valve LS-14 to change over the same, so that the cylinder CYL-4 rod is retired. When this rod 24 of the cylinder CYL-4 is retired, the slide board 9 is raised through the rod 24, rocking arm 23 and connection rod 26, conversely to the above-mentioned operation where the cylinder CYL-4 rod is advanced. Thus, the slide board 9 abuts on the mechanical valve LS-7 (See H in FIG. 11). Accordingly, the cylinder CYL-1 rod of the conveyance mechanism 15 is advanced to cause the operating member 82 to escape from between the rollers 80 through the slide shaft 81. As the operating member 82 is raised, the rocking pieces 75 are rocked toward each other by the restoring force of the coil spring 79 to cause the sandwiching pawls 77 to be pressed against each other. Thus, the sandwiching pawls 77 hold the coil spring 4 (See I in FIG. 11). When, in this way, the advancing movement of the cylinder CYL-1 rod proceeds to bring it to a prescribed position, it abuts on the mechanical valve LS-2 to change over the same, so that the cylinder CYL-6 rod of the feed mechanism 11 is retired.

When the cylinder CYL-6 rod is retired, the operating member 54 escapes from between the rollers 50 to cause the sandwiching sections 49 to be pressed against each other by the restoring force of the coil spring 52. Accordingly, the rope 4 is sandwiched between the sandwiching sections 49 (See J in FIG. 11). When, in this way, the cylinder CYL-6 rod is retired to a prescribed position, it abuts on the mechanical valve LS-11 to change over the same, so that the cylinder CYL-7 rod of the separation mechanism 10 is retired. Since, in accordance with this retiring movement of the cylinder CYL-7 rod, the slider 30 connected thereto is also retired, the stop pin 31 is also retired from the guide hole 28 to permit the stop piece 32 to be advanced. For this reason, the coil springs 4 received in the guide hole 28 are lowered in turn, and the coil spring 4 theretofore stopped by the stop pin 31 is allowed to drop and abut against the stop piece 32 (See K in FIG. 11). When, in this way, the retiring movement of the cylinder CYL-7 rod proceeds to bring it to a prescribed position, it abuts on the mechanical valve LS-13 to change over the same, so that the cylinder CYL-5 rod for the supply and cutting mechanisms 13, 14 is advanced. As a result of this advancing movement, the moving piece 61 is slided into between the guide pieces 60 through that rod 59 to cause the movable pieces 63 to be moved in a direction spaced from each other through the crank mechanism 62. When the sandwiching pieces 65 go away from each other in accordance with said retiring movement of the movable pieces 63, the sandwiching sections 67 and the cutting blades 68 are respectively spaced from each other against the restoring force of the spring 66 to go away from the rope 5 and the coil spring 4 (See L in FIG. 11). When the cylinder CYL-5 rod is further advanced and thus brought to a prescribed position, it abuts on the mechanical valve LS-10 to change over the same, so that both the cylinder CYL-3 and cylinder CYL-8 are operated at the same time. To explain first the operation of one cylinder CYL-3, the cylinder CYL-3 rod is retired by said change-over of the mechanical valve LS-10 to cause the lifting board 12 to be lowered through this rod 58. Accordingly, the supply mechanism 13, cutting mechanism 14 and conveyance mechanism 15 is provided on the lifting board 12 are moved in a direction going away from the feed mechanism 11 (See M in FIG. 11). When the cylinder CYL-3 rod is thus retired up to a prescribed position, the lifting board 12 abuts on the mechanical valve LS-5 to change over the same, so that the cylinder CYL2 rod of the conveyance mechanism 15 is retired. When the cylinder CYL-2 rod is retired, the rocking arm 86 interlocked therewith is correspondingly rocked and this rocking movement is transmitted to the large gear 85 and then to the small gear 83. Accordingly, the rotary cylinder 72 is correspondingly rotated to cause the rocking pieces 75 to be integrally rocked one-directionally through the attachment base 74 with the rotary cylinder 72 as a rotation axis. For this reason, the sandwiching pawls 77 provided at the tip end portions of the rocking pieces 75 are integrally rocked in one direction to go away from the facing position to the sandwiching sections 67 of the supply mechanism 13 thus to face a receiving section 95 provided outside the device (See N in FIG. 11). Thereafter, when, similarly to the above, the cylinder CYL-1, upon the start of the operation cycle, is supplied with a input signal to cause its rod to be retired, the sandwiching pawls 77 are spaced from each other to cause the coil spring 4 sandwiched therebetween to drop into a receiving section 95 (See A in FIG. 11).

When the mechanical valve LS-1 is changed over to cause the cylinder CYL-2 rod to be advanced, the cylinder CYL-8 rod is also advanced simultaneously and therefore the connection plate 38 is also moved through the piston rod 37. Accordingly, the detection rod 39 is held in a state moved in a direction going away from the guide hole 28. When, under this condition, the cylinder CYL-5 rod for the supply and cutting mechanisms 13, 14 is advanced to cause the mechanical valve LS-10 to be changed over, the cylinder CYL-8 rod is retired. Accordingly, the connection plate 38 is moved through the rod 37 to cause the detection rod 39 to be slided toward the guide hole 28 through the coil spring 42. When the detection rod 39 is thus inserted into the through hole 40 to abut against the side face of the coil spring 4 placed in the guide hole 28, its movement is stopped. In this case, the connection plate 38 continues to be moved further. Therefore, the coil spring 42 is gradually compressed to slide along the detection rod 39. Accordingly, the moving amount of the detection rod 39 is maintained to be less than prescribed to prevent the rocking piece 43 from causing the microswitch 45 to be operated, so that the detection rod 39 detects that a prescribed number of coil springs 4 are received in the guide hole 28. However, when a prescribed number of coil springs are not received in the guide hole 28, the detection rod 39 is inserted via the through hole 40 into the guide hole 28 in accordance with the movement of the connection plate 38 and the tip end of the detection rod 39 is further moved across the guide hole 28 up to the inner wall thereof on the opposite side, so that the moving amount of the detection rod 39 exceeds a prescribed valve. Accordingly, the rocking piece 43 connected to the detection rod 39 is rocked correspondingly to cause the microswitch 45 to be closed, from which it is seen that a prescribed number of coil springs 4 are not received in the guide hole 28. When, in this way, the microswitch 45 is closed, the cylinder CYL-6 rod for the feed mechanism 11 is advanced to cause the mechanical valve LS-12 to be changed over, so that the cylinder CYL-4 rod is retired with the separation mechanism 10 remaining to be ready for the next operation. When the slide board 9 interlocked with this cylinder CYL-4 rod is raised to cause the mechanical valve LS-7 to be changed over, the cylinder CYL-6 rod of the feed mechanism 11 is retired. When the mechanical valve LS-11 is changed over in accordance with the operation of this cylinder CYL-6 rod, the cylinder CYL-5 rod of the feed mechanism 13 is advanced to cause the mechanical valve LS-10 to be changed over, so that the cylinder CYL-4 rod is advanced to lower the slide board 9. By repeatedly performing this operation, the slide board 9 is allowed to make vertical reciprocating movements and the coil springs 4 from the delivery mechanism 7 are thereby introduced into the guide hole 28 of the separation mechanism 10. When a prescribed number of coil springs 4 are thus supplied into the guide hole 28 of the separation mechanism, the same operation as mentioned above is again started.

The foregoing operation is for the purpose of delivering the coil springs 4 from the delivery mechanism 7 by cutting off only the rope 5 inserted into the coil springs 4 through the repeated operations of the cylinders CYL-4, 5, 6 carried out using a mechanism which is made operative only when, as a result of detecting the presence of the coil springs 4, no coil spring 4 has been detected. To explain this operation with reference to the systematic line view of FIG. 13, an air supply source 96 is branched into two parts—operating circuit 97 and control circuit 98, and this control circuit 98 is further branched through a switching valve SL-1 into two parts—manually operable circuit 99 and automatic circuit 100. On the way to this circuit 100 there are provided a stop circuit 101 and an operation-starting circuit 102, the former 101 being composed of a push-button switch PB-1 and a solenoid valve SOL-1, the latter 102 being composed of a push-button switch PB-2. The automatic circuit 100 is further branched into two parts—relay valves $R_1A$ and $R_1B$, and is normally connected through this relay valve $R_1$ B, a relay valve $R_2B$ and a relay valve $R_3B$ to the mechanical valves LS-1, 4, 6, 8, 9, 12 and 14. Accordingly, when the automatic circuit 100 is not supplied with any input signal from the microswitch 45, it makes normal operation by opening the relay valve $R_8B$ through the mechanical valve LS-12 and operating relay valves $R_2A$, $R_4B$, $R_5B$, $R_6B$ and $R_7B$. When, however, the automatic circuit 100 is supplied with that input signal from the microswitch 45 which indicates the absence of any coil spring 4, the solenoid valve SOL.V-2 is operated, and the relay valve $R_8B$ is closed while a relay valve $R_8A$ is opened. As a result, the relay valves $R_8A$, $R_4A$, $R_5A$, $R_6A$, $R_7A$ and $R_2A$ are opened through the mechanical valve LS-12 to cause the cylinder CYL-4 rod to be retired. Accordingly, the mechanical valve LS-7 is changed over to cause cylinder CYL-6 rod to be retired through the relay valve $R_4A$ to cause the rope 5 to be sandwiched by the sandwiching sections 49, 49. When the mechanical valve LS-11 is thus changed over, the cylinder CYL-5 rod is advanced through the relay valve $R_5$ A to cause the sandwiching pieces 65, 65 to be opened. When these sandwiching pieces 65, 65 are released from each other, the mechanical valve LS-10 is changed over to cause the cylinder CYL-4 rod to be advanced first through the relay valve $R_6A$ and then through the relay valves $R_2B$ and $R_3A$, thereby to cause the rope 5 to be delivered. When the mechanical valve LS-8 is thus changed over to cause the cylinder CYL-5 rod to be retired, the sandwiching pieces 65, 65 and the cut-off blades 68, 68 are respectively closed thus to cause the rope 5 to be cut off. When the mechanical valve LS-9 is thus changed over to cause the cylinder CYL-6 rod to be advanced, the sandwiching sections 49, 49 are opened and simultaneously the mechanical valve LS-12 is changed over thus to complete the cut-off operation of the rope 5 only. However, the operating time of the solenoid valve SOL.V-2 when a prescribed number of coil springs 4 are not received in the guide hole 28 can be selectively set, by setting a timer to a prescribed length of time, so as to permit the rope 5 only to be cut off a prescribed number of times, and when the cutting-off of the rope 5 only is effected said prescribed number of times, the holding state of the solenoid valve SOL.V-2 is released to cause the relay valve $R_8$ to be changed over to $R_8B$ thus to cause the automatic circuit 100 to make normal operation. Accordingly, the coil springs 4 wound about the rotary drum 6 of the delivery mechanism 7 can be guided along the rope 5 and separated one by one to be supplied automatically.

Note that in FIGS. 14A, 14B, 14C and 14D there are shown enlarged a relay valve R, a push-button switch PB, a mechanical valve LS and a change-over valve SL, respectively.

The preceding embodiment referred to the case with the coil springs used for electro-magnetic relays or the like, but this invention does not impose any limitation on the size and configuration of the coil springs and permits the automatic supply of any coil-like article if it is of the type which, in a state inserted over a rope, can be separated one by one along this rope.

As above described, this invention is constructed so that a large number of coil-like articles inserted over the rope are separated one by one by the separation mechanism; and this separated coil-like article is fed to the supply mechanism and, by further cutting off said rope, drawn out from said rope to be brought to a prescribed position, whereby the coil-like article supply conventionally manually performed can be wholly automatically effected to increase the operation efficiency.

What we claim is:

1. A coil-like article supply device comprising a base, a delivery mechanism mounted on the base, for sequentially delivering a large number of coil-like articles and a rope inserted through the coil-like articles, a separation mechanism for receiving by a prescribed number said coil-like articles delivered from said delivery mechanism along said rope and separating and releasing said prescribed number of coil-like articles one by one with a prescribed timing, a supply mechanism provided facing said separation mechanism and movable for receiving said coil-like articles released from said separation mechanism to supply them to a proper place, a feed mechanism so provided as to be reciprocatingly moved between said supply mechanism and said separation mechanism, for pulling with a prescribed timing said rope inserted into said separation mechanism, and a cutting mechanism provided facing said supply mechanism, for cutting with a prescribed timing said rope pulled by said feed mechanism.

2. A coil-like article supply device according to claim 1 further comprising means provided between said delivery mechanism and said separation mechanism, for detecting the degree of tension of said rope to control the operation of said delivery mechanism.

3. A coil-like article supply device according to claim 1 wherein said separation mechanism includes detecting means for detecting whether or not said prescribed number of coil-like articles are received in said separation mechanism, thereby controlling the operation of said feed mechanism in accordance with the detected condition of said detecting means to permit said prescribed number of coil-like articles to be always received in said separation mechanism.

4. A coil-like article supply device according to claim 1 wherein said delivery mechanism includes a rotary drum wound with said rope carrying a large number of said coil-like articles, and driving means for rotating said rotary drum.

5. A coil-like article supply device according to claim 1 wherein said separation mechanism includes a slide member, a guide member attached to the slide member, said guide member having a guide hole for passing said coil-like articles and said rope therethrough, a stop piece movably provided on the underside of said guide member so as to permit said guide hole to be opened and closed, and a member for preventing a drop of said coil-like articles disposed in said guide hole other than the lowest coil-like article.

6. A coil-like article supply device according to claim 1 wherein said supply mechanism includes a pair of moving plates for cooperatively holding said coil-like articles one by one when closed and releasing the held condition of said coil-like articles when opened.

7. A coil-like article supply device according to claim 1 wherein said feed mechanism includes a pair of feed members for cooperatively sandwiching said rope and pulling it downward.

8. A coil-like article supply device according to claim 1 wherein said cutting mechanism includes a pair of movable blades attached on the lower side of said feed mechanism, for cutting said rope in cooperation with said feed mechanism.

* * * * *